US012036812B2

(12) United States Patent
Penington

(10) Patent No.: US 12,036,812 B2
(45) Date of Patent: Jul. 16, 2024

(54) FOLDABLE CLIPBOARD

(71) Applicant: MedInfo, Inc., Westminster, CO (US)

(72) Inventor: Desi Penington, Brighton, CO (US)

(73) Assignee: MEDINFO, INC., Westminster, CO (US)

(*) Notice: Subject to any disclaimer, the term of this patent is extended or adjusted under 35 U.S.C. 154(b) by 0 days.

(21) Appl. No.: 17/967,610

(22) Filed: Oct. 17, 2022

(65) Prior Publication Data

US 2024/0123755 A1 Apr. 18, 2024

(51) Int. Cl.
*B42F 9/00* (2006.01)

(52) U.S. Cl.
CPC .................................... *B42F 9/001* (2013.01)

(58) Field of Classification Search
CPC ........................................................ B42F 9/001
See application file for complete search history.

(56) References Cited

U.S. PATENT DOCUMENTS

| | | | | | |
|---|---|---|---|---|---|
| 111,886 | A * | 2/1871 | Tapley | B42F 9/001 24/17 R | |
| 409,827 | A * | 8/1889 | Brown | B42F 9/001 24/67.11 | |
| 410,532 | A * | 9/1889 | Carroll et al. | B42F 9/001 24/67.7 | |
| 434,160 | A * | 8/1890 | Rubel | B42F 9/001 24/67.5 | |
| 1,732,584 | A | 10/1929 | Newman | | |
| 2,375,243 | A | 5/1945 | Pinkett | | |
| 2,906,267 | A | 9/1959 | Loudon | | |
| RE24,841 | E | 6/1960 | Roche | | |
| 3,791,314 | A | 2/1974 | Berretta | | |
| 3,944,374 | A | 3/1976 | Young et al. | | |
| 4,019,823 | A | 4/1977 | Kleinert et al. | | |
| 4,555,128 | A | 11/1985 | White et al. | | |
| 4,583,562 | A | 4/1986 | Stewart | | |
| 4,771,976 | A | 9/1988 | Su | | |
| 4,828,502 | A | 5/1989 | Leahy | | |

(Continued)

FOREIGN PATENT DOCUMENTS

| | | |
|---|---|---|
| GB | 6018387 | 9/2017 |
| GB | 6018393 | 9/2017 |

(Continued)

OTHER PUBLICATIONS

U.S. Appl. No. 29/856,787, filed Oct. 17, 2022, Penington.

(Continued)

*Primary Examiner* — Jason W San
(74) *Attorney, Agent, or Firm* — Sheridan Ross P.C.

(57) ABSTRACT

A foldable clipboard includes at least three support panels that each have an upper surface. At least one of the support panels includes a set of apertures operable to receive an attachment feature. At least one hinge pivotably couples each adjacent set of support panels. The clipboard is capable of transitioning between a folded configuration and an unfolded configuration via the at least one hinge pivotably coupling each adjacent set of support panels. The upper surfaces of each of the at least three support panels form a combined upper surface having a substantially constant and consistent thickness that provided a writing surface when the clipboard is in the unfolded configuration.

20 Claims, 10 Drawing Sheets

(56) References Cited

U.S. PATENT DOCUMENTS

| | | | | | |
|---|---|---|---|---|---|
| 4,892,334 | A | | 1/1990 | Sinclair | |
| D308,542 | S | * | 6/1990 | De Witt | D19/86 |
| D317,788 | S | * | 6/1991 | DeWitt | D6/406.4 |
| D319,472 | S | * | 8/1991 | Clyburn | D18/49 |
| 5,060,581 | A | | 10/1991 | Malinski | |
| 5,150,873 | A | | 9/1992 | Donovan | |
| D344,409 | S | | 2/1994 | Meredith | |
| D349,130 | S | | 7/1994 | Nigris et al. | |
| D354,520 | S | | 1/1995 | Pong | |
| D356,339 | S | | 3/1995 | Gebroek | |
| 5,413,035 | A | | 5/1995 | Fernandez | |
| 5,513,749 | A | | 5/1996 | Simmons | |
| 5,560,476 | A | | 10/1996 | Lee | |
| 5,645,165 | A | | 7/1997 | Taniyama | |
| D383,491 | S | | 9/1997 | Chang | |
| 5,823,353 | A | | 10/1998 | Perrin et al. | |
| D409,664 | S | | 5/1999 | Perrin et al. | |
| D418,875 | S | | 1/2000 | Paik | |
| 6,070,721 | A | | 6/2000 | Levitan | |
| 6,179,332 | B1 | | 1/2001 | Funkhouser | |
| 6,213,439 | B1 | * | 4/2001 | Giulie | A47B 97/04 248/459 |
| D444,178 | S | * | 6/2001 | Citron | D19/91 |
| 6,662,733 | B1 | | 12/2003 | Scott | |
| 6,672,622 | B2 | | 1/2004 | Barron | |
| D517,328 | S | | 3/2006 | Thrall | |
| D579,754 | S | | 11/2008 | Gleason | |
| 7,469,871 | B2 | | 12/2008 | Cooper | |
| D611,544 | S | * | 3/2010 | Liptan | D19/88 |
| 7,673,908 | B2 | * | 3/2010 | Liptan | B42F 9/001 281/45 |
| D724,666 | S | | 3/2015 | Paulick et al. | |
| D745,604 | S | | 12/2015 | Magaudda | |
| 9,522,560 | B2 | | 12/2016 | Paulick et al. | |
| D896,592 | S | * | 9/2020 | Starkey | D7/610 |
| 11,219,822 | B2 | | 1/2022 | Johnson | |
| 11,235,793 | B1 | | 2/2022 | Koester | |
| D968,512 | S | * | 11/2022 | Rodgers | D19/88 |
| 11,485,164 | B1 | * | 11/2022 | Khaliq | B42F 9/001 |
| D979,647 | S | * | 2/2023 | Wang | D19/88 |
| D980,907 | S | | 3/2023 | Huang et al. | |
| D982,076 | S | | 3/2023 | Khaliq | |
| D982,077 | S | * | 3/2023 | Khaliq | D19/88 |
| D982,078 | S | * | 3/2023 | Khaliq | D19/88 |
| D982,079 | S | * | 3/2023 | Khaliq | D19/88 |
| 11,850,879 | B2 | * | 12/2023 | Khaliq | B42F 9/002 |
| 2001/0000901 | A1 | | 5/2001 | Kambouris et al. | |
| 2003/0106979 | A1 | | 6/2003 | Richardson | |
| 2004/0154944 | A1 | * | 8/2004 | Morisset | B42F 7/14 206/425 |
| 2004/0217677 | A1 | | 11/2004 | Durand et al. | |
| 2004/0234939 | A1 | | 11/2004 | Smith et al. | |
| 2006/0175520 | A1 | * | 8/2006 | Cooper | B60N 3/005 248/444 |
| 2009/0315313 | A1 | | 12/2009 | Kalman | |
| 2010/0084848 | A1 | * | 4/2010 | Nguyen | B42F 9/001 24/67 R |
| 2023/0085864 | A1 | * | 3/2023 | Khaliq | B42F 9/002 281/49 |
| 2023/0087799 | A1 | * | 3/2023 | Khaliq | B42F 1/02 281/45 |
| 2023/0106163 | A1 | * | 4/2023 | Khaliq | B42F 9/002 281/49 |

FOREIGN PATENT DOCUMENTS

| | | |
|---|---|---|
| GB | 6274174 | 4/2023 |
| JP | 6725707 | 7/2020 |

OTHER PUBLICATIONS

"Crease," Dictionary.com, 2009, retrieved Apr. 22, 2009 from http://dictionary.reference.com/browse/crease, 5 pages.
"ASA Folding Lapboard," CFI Pilot Shop, 2007, retrieved Jan. 31, 2007 from https://www.cfipilot.com/ASA-Folding-Lapboard-p/asa-kb-lap.htm, 2 pages.
"Portable Desktops," Saunders Mfg. Co. Inc., 2007, retrieved Jan. 31, 2007 from https://web.archive.org/web/20070806043427/http://saunders-usa.com/core/?brand=70, 1 page.
"Nursing Clipboard with Nursing and Medical Edition Cheat Sheets 3 Layers Aluminum Foldable Nurse Clip Boards Notepad for Students, Nurses, and Doctors (Mint)," SC Printing World Store via Amazon.com, Nov. 25, 2021, retrieved from https://www.amazon.com/dp/B09MKYBMG3, 11 pages.
Santentre Nursing Clipboard Foldable, 3 Layers Aluminum Clipboard Pocket Size with Nursing Medical Edition Cheat Sheets, Folding Clip Boards for Nurses, Nurse Accessories (Blue), Santentre via Amazon.com, Apr. 12, 2023, retrieved from https://www.amazon.com/Santentre-Clipboard-Foldable-Aluminum-Accessories/dp/B0C279PCRQ/, 7 pages.
"WhiteCoat Clipboard® Trifold—Lilac Nursing Edition," WhiteCoat Clipboard Store via Amazon.com, Jun. 6, 2022, retrieved from https://www.amazon.com/Whitecoat-Clipboard%C2%AE-Trifold-Lilac-Nursing/dp/B0B5LZWR1C/, 7 pages.
Official Action for U.S. Appl. No. 29/856,787, dated Aug. 16, 2023, 8 pages.

* cited by examiner

FOLDABLE CLIPBOARD

FIELD

The present disclosure relates generally to office and medical supplies. More specifically, embodiments of the present disclosure relate to a writing surface including a clipboard. The clipboard is foldable along at least one axis through a hinge to facilitate a reducing of writing area and overall size of the clipboard for transportation and/or storage.

BACKGROUND

Numerous occupations, hobbies, and other endeavors requires the use of a transportable and storable writing surface that is moveable between various locations and provides an area on which a user may write, draw, and/or otherwise make notations while at the various locations. One example of the writing surface is a clipboard. Clipboards have been used to facilitate note-taking. Clipboards have also been used to assist in the organization of papers while taking notes or reading, including providing a way to secure the papers on which the notes are being taken and/or that are being read, providing a way to secure the papers during transportation and/or storage of the clipboard, and the like. In general, the clipboard can be a highly versatile and useful tool. However, providing a suitable writing surface often requires a clipboard be large or otherwise cumbersome for a user, including during transportation and/or storage.

SUMMARY

Accordingly, there is a long-felt but unmet need for a foldable clipboard. The clipboard should provide an unfolded or non-compact form with a large surface that facilitates note-taking or reading when in a first configuration. The clipboard should also provide a folded or compact form that allows for increased ease of transportation and/or storage when in a second configuration. The clipboard should also include components to facilitate the transition between the first configuration and the second configuration. The clipboard should also provide attachment features that retain items such as paper and the like against a surface of the clipboard when note-taking, transportation of the items, storage of the items, and the like.

Aspects of the present disclosure are directed to a foldable clipboard. The foldable clipboard includes at least two support panels that are coupled together. The foldable clipboard includes an attachment feature that retains items such as paper against a surface of the clipboard. The foldable clipboard is configured to transition between an unfolded configuration that is non-compact and provides a substantially flat surface for a user, and a folded configuration that is compact for transportation and/or storage.

In some aspects of the present disclosure, the at least two support panels are coupled together with at least one actuation component that facilitate the transition of the clipboard between the folded configuration and the unfolded configuration. When in the unfolded configuration, the clipboard may provide a surface that is large enough for a user to make notations, to support paper being read, and the like. The at least two support panels may be proximate to each other along a first set of adjacent surfaces, and may provide a substantially flat writing surface. When in the folded configuration, the clipboard may be in a compact form that facilitates an increased ease in transportation and/or stage. The at least two support panels may be proximate to each other along a second set of adjacent surfaces.

In some embodiments, the at least one actuation component (e.g., a hinge, or the like) may be configured to facilitate a substantially flush interface between adjacent surfaces when the at least three support panels are in the unfolded configuration and/or the folded configuration. Where there are at least three support panels and at least two actuation components, the at least two actuation components may be differently configured to facilitate the substantially flush interface between each respective set of adjacent surfaces.

In some aspects of the present disclosure, the clipboard includes an attachment feature that retains items such as paper against a surface of the clipboard. The attachment feature (e.g., such as a clip, or the like) may be positioned on or proximate to the writing surface available when the clipboard is in the unfolded configuration, to retain paper on the writing surface.

In some aspects of the present disclosure, the clipboard may include an attached or unattached sheet or cover that can span across the writing surface when the clipboard is in the unfolded configuration to provide a smooth surface over the seam between proximate support panels. In other embodiments, the sheet or cover may also be usable to assist in retaining the clipboard in the folded configuration, to prevent an unintended transition from the folder configuration to the unfolded configuration.

In some aspects of the present disclosure, the clipboard includes a locking mechanism or other engaging feature (e.g., a latch, or the like) that causes the clipboard to remain in the folded position or the unfolded position when engaged. The locking mechanism or other engaging feature may be in addition to or instead of the sheet or cover, as described through the present disclosure.

In other aspects of the present disclosure, one or more surfaces may be usable as a writing surface and/or may have items such as paper retained to the surface via an attachment feature when the clipboard is in the folded configuration.

In one aspect of the present disclosure, a foldable clipboard comprises a top support panel with a top upper surface and at least one set of apertures operable to receive an attachment feature. The foldable clipboard comprises a middle support panel with a middle upper surface. The foldable clipboard comprises a bottom support panel with a bottom upper surface. The foldable clipboard comprises a first hinge pivotably coupling the top support panel to the middle support panel. The foldable clipboard comprises a second hinge pivotably coupling the middle support panel to the bottom support panel. The clipboard is capable of transitioning between a folded configuration and an unfolded configuration. The top support panel and the bottom support panel are each capable of transitioning between a folded position and an unfolded position relative to the middle support panel via the first hinge and the second hinge. The top upper surface, the middle upper surface, and the bottom upper surface form a combined upper surface having a substantially constant and consistent thickness when the clipboard is in the unfolded configuration.

In some aspects, the attachment feature is a clip coupled to the top support panel via the at least one set of apertures and capable of securing items against at least the top upper surface. In some aspects, the top support panel transitions first from the folded configuration to the unfolded configuration relative to the middle support panel, and the bottom support panel transitions second from the folded configuration to the unfolded configuration relative to the middle support panel. An upper surface of the bottom support panel is proximate to a lower surface of the top support panel when in the folded configuration.

In some aspects, the clipboard comprises a third hinge pivotably coupling the top support panel to the middle support panel at a second location on a second side edge that is opposite a first location on a first side edge at which the first hinge pivotably couples the top support panel to the middle support panel. The clipboard comprises a fourth hinge pivotably coupling the bottom support panel to the middle support panel at a fourth location on the second side edge that is opposite a third location on the first side edge at which the second hinge pivotably couples the bottom support panel to the middle support panel.

In some aspects, the top support panel and the middle support panel are pivotably coupled by the first hinge including a first hinge plate, a second hinge plate and a first pin. The top support panel and the middle support panel are pivotably coupled by the third hinge including a third hinge plate, a fourth hinge plate, and a second pin. In some aspects, the first hinge plate is positioned outward from a first side portion of the top support panel an amount substantially equal to a first distance. The second hinge plate is positioned outward from a first side portion of the middle support panel an amount substantially equal to a second distance. The third hinge plate is positioned outward from a second side portion of the top support panel an amount substantially equal to the second distance. The fourth hinge plate is positioned outward from a second side portion of the middle support panel an amount substantially equal to the first distance. The first distance is different from the second distance. In some aspects, the first hinge plate and the third hinge plate are integrated with the top support panel. The second hinge plate and the fourth hinge plate are integrated with the middle support panel. In some aspects, the first hinge plate is pivotable with respect to the third hinge plate about a first axis through the first pin. The second hinge plate is pivotable with respect to the fourth hinge plate about a second axis through the second pin. The first axis and the second axis are substantially coaxial.

In some aspects, the middle support panel and the bottom support panel are pivotably coupled by the second hinge including a first hinge plate, a second hinge plate and a first pin. The middle support panel and the bottom support panel are pivotably coupled by the fourth hinge including a third hinge plate and a fourth hinge plate and a second pin. In some aspects, the first hinge plate is positioned outward from a first side portion of the middle support panel an amount substantially equal to a first distance. The second hinge plate is positioned outward from a first side portion of the bottom support panel an amount substantially equal to a second distance. The third hinge plate is positioned outward from a second side portion of the middle support panel an amount substantially equal to the second distance. The fourth hinge plate is positioned outward from a second side portion of the bottom support panel an amount substantially equal to the first distance. The first distance is different from the second distance. In some aspects, the first hinge plate and the third hinge plate are integrated with the middle support panel. The second hinge plate and the fourth hinge plate are integrated with the bottom support panel. In some aspects, the first hinge plate is pivotable with respect to the third hinge plate about a first axis through the first pin. The second hinge plate is pivotable with respect to the fourth hinge plate about a second axis through the second pin. The first axis and the second axis are substantially coaxial.

In some aspects, the set of hinge plates of the first hinge define a distance between the top upper surface of the top support panel and the middle upper surface of the middle support panel when the clipboard is in the folded configuration that is equal or greater to a total height of the attachment feature when installed on the top support panel.

In some aspects, the top support panel and the middle support panel are pivotably coupled by the first hinge including a first hinge plate, a second hinge plate and a first pin. The middle support panel and the bottom support panel are pivotably coupled by the second hinge including a third hinge plate, a fourth hinge plate, and a second pin. The first hinge plate is positioned outward from a first side portion of the top support panel an amount substantially equal to a first distance. The second hinge plate is positioned outward from a first side portion of the middle support panel an amount substantially equal to a second distance. The third hinge plate is positioned outward from the first side portion of the middle support panel an amount substantially equal to the first distance. The fourth hinge plate is positioned outward from a first side portion of the bottom support panel an amount substantially equal to the second distance. The first distance is different from the second distance.

In some aspects, at least one of the top support panel, the middle support panel, and the bottom support panel are substantially rigid. The top support panel and the bottom support panel are interchangeable for being substantially identical in size and shape. At least one of the top support panel, the middle support panel, or the bottom support panel are each fabricated from a metal or a plastic.

In another aspect of the present disclosure, a foldable clipboard comprises a top support panel with a top upper surface. The top support panel includes at least one set of apertures operable to receive an attachment feature. The foldable clipboard comprises a middle support panel with a middle upper surface. The foldable clipboard comprises a bottom support panel with a bottom upper surface. The bottom support panel and the top support panel are substantially identical in size and shape. The foldable clipboard comprises a first hinge pivotably coupling the top support panel to the middle support panel. The at least a first hinge includes a first hinge plate integrated with the top support panel and a second hinge plate integrated with the middle support panel. The foldable clipboard comprises a second hinge pivotably coupling the middle support panel to the bottom support panel. The second hinge includes a third hinge plate integrated with the middle support panel and a fourth hinge plate integrated with the bottom support panel. The clipboard is capable of transitioning between a folded configuration and an unfolded configuration. The top support panel and the bottom support panel are each capable of transitioning between a folded position and an unfolded position relative to the middle support panel via the first hinge and the second hinge.

In some aspects, the top upper surface, the middle upper surface, and the bottom upper surface form a combined upper surface having a substantially constant and consistent thickness when the clipboard is in the unfolded configuration. The attachment feature is a clip coupled to the top support panel via the at least one set of apertures and capable of securing items against at least the combined upper surface.

In some aspects, the top support panel and the middle support panel are pivotably coupled by the first hinge including a first hinge plate, a second hinge plate and a first pin. The middle support panel and the bottom support panel are pivotably coupled by the second hinge including a third hinge plate, a fourth hinge plate, and a second pin. The first hinge plate is positioned outward from a first side portion of the top support panel an amount substantially equal to a first distance. The second hinge plate is positioned outward from a first side portion of the middle support panel an amount substantially equal to a second distance. The third hinge plate is positioned outward from the first side portion of the middle support panel an amount substantially equal to the first distance. The fourth hinge plate is positioned outward from a first side portion of the bottom support panel an amount substantially equal to the second distance. The first distance is different from the second distance.

In another aspect of the present disclosure, a foldable clipboard comprises a first support panel with a first upper surface. The foldable clipboard comprises a second support panel with a second upper surface. The foldable clipboard comprises a third support panel with a third upper surface. The foldable clipboard comprises a first hinge pivotably coupling the first support panel to the second support panel. The foldable clipboard comprises a second hinge pivotably coupling the second support panel to the third support panel. The foldable clipboard comprises a clip coupled to the first support panel and capable of securing items against at least the first upper surface. The clipboard is capable of transitioning between a folded configuration and an unfolded configuration. The first support panel and the third support panel are each capable of transitioning between a folded position and an unfolded position relative to the second support panel via the first hinge and the second hinge. The first upper surface, the second upper surface, and the third upper surface form a combined upper surface having a substantially constant and consistent thickness when the clipboard is in the unfolded configuration.

In some aspects, the first support panel and the second support panel are pivotably coupled by the first hinge including a first hinge plate, a second hinge plate and a first pin. The second support panel and the third support panel are pivotably coupled by the second hinge including a third hinge plate, a fourth hinge plate, and a second pin. The first hinge plate is positioned outward from a first side portion of the first support panel an amount substantially equal to a first distance. The second hinge plate is positioned outward from a first side portion of the second support panel an amount substantially equal to a second distance. The third hinge plate is positioned outward from the first side portion of the second support panel an amount substantially equal to the first distance. The fourth hinge plate is positioned outward from a first side portion of the third support panel an amount substantially equal to the second distance. The first distance is different from the second distance.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In addition, the materials, methods, and examples are illustrative only and are not intended to be necessarily limiting.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The transitional term "comprising" is synonymous with "including," "containing," or "characterized by," is inclusive or open-ended and does not exclude additional, unrecited elements or method steps.

Unless otherwise indicated, all numbers expressing quantities, dimensions, conditions, ratios, ranges, and so forth used in the specification and claims are to be understood as being modified in all instances by the term "about" or "approximately." Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 5% of the stated value.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The transitional phrase "consisting of" excludes any element, step, or ingredient not specified in the claim, but does not exclude additional components or steps that are unrelated to the disclosure such as impurities ordinarily associated therewith.

The transitional phrase "consisting essentially of" limits the scope of a claim to the specified materials or steps and those that do not materially affect the basic and novel characteristic(s) of the claimed invention.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The preceding is a simplified summary of the disclosure intended to provide an understanding of some aspects of the settler devices of this disclosure. This Summary is neither an extensive nor exhaustive overview of the invention and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. As will be appreciated, other embodiments are possible using, alone or in combination, one or more of the features set forth above or described herein. For example, it is contemplated that various features and devices shown and/or described with respect to one embodiment may be combined with or substituted for features or devices of other embodiments regardless of whether or not such a combination or substitution is specifically shown or described herein. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosure.

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1A:
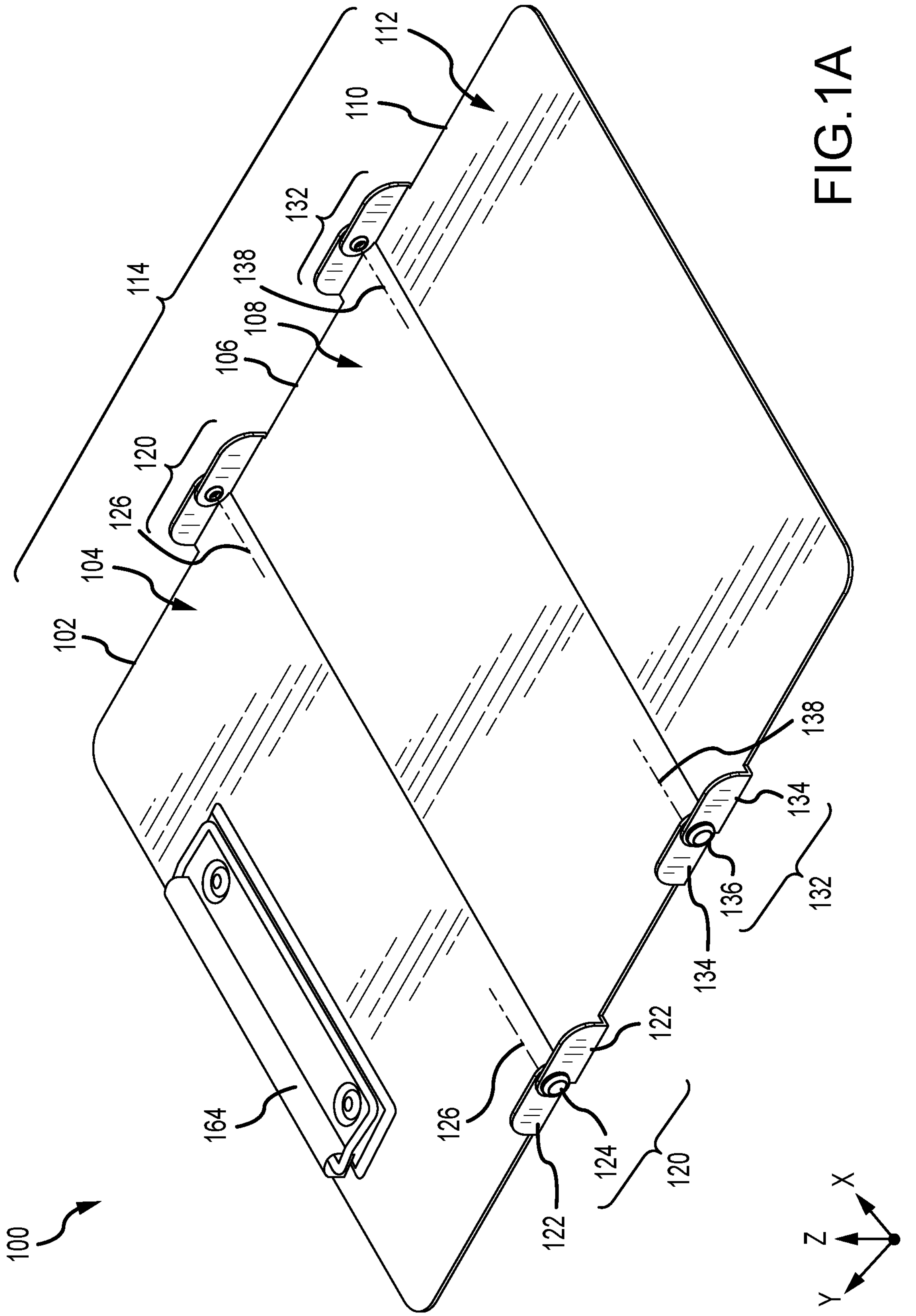
Figure 1B:
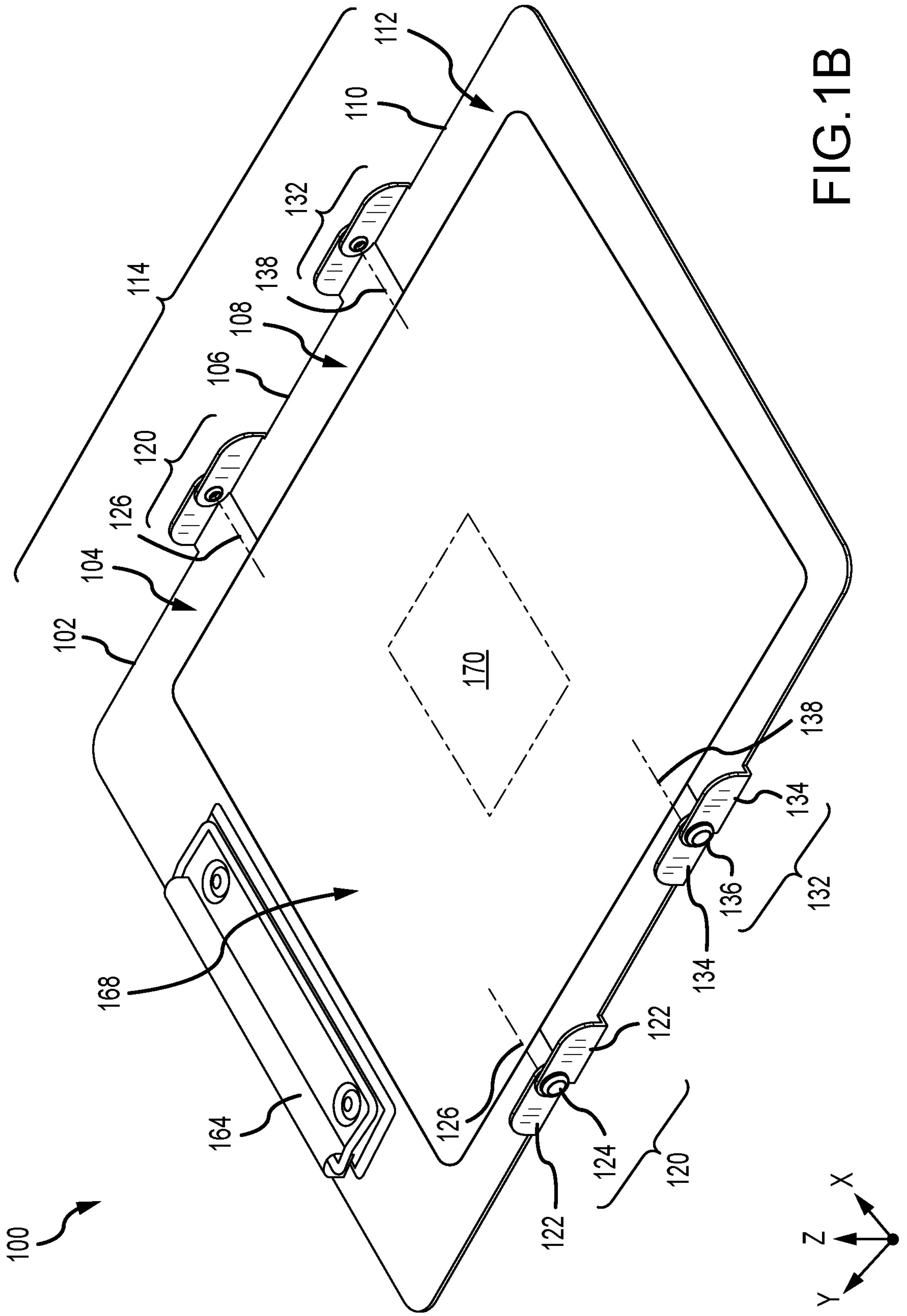
Figure 2A:
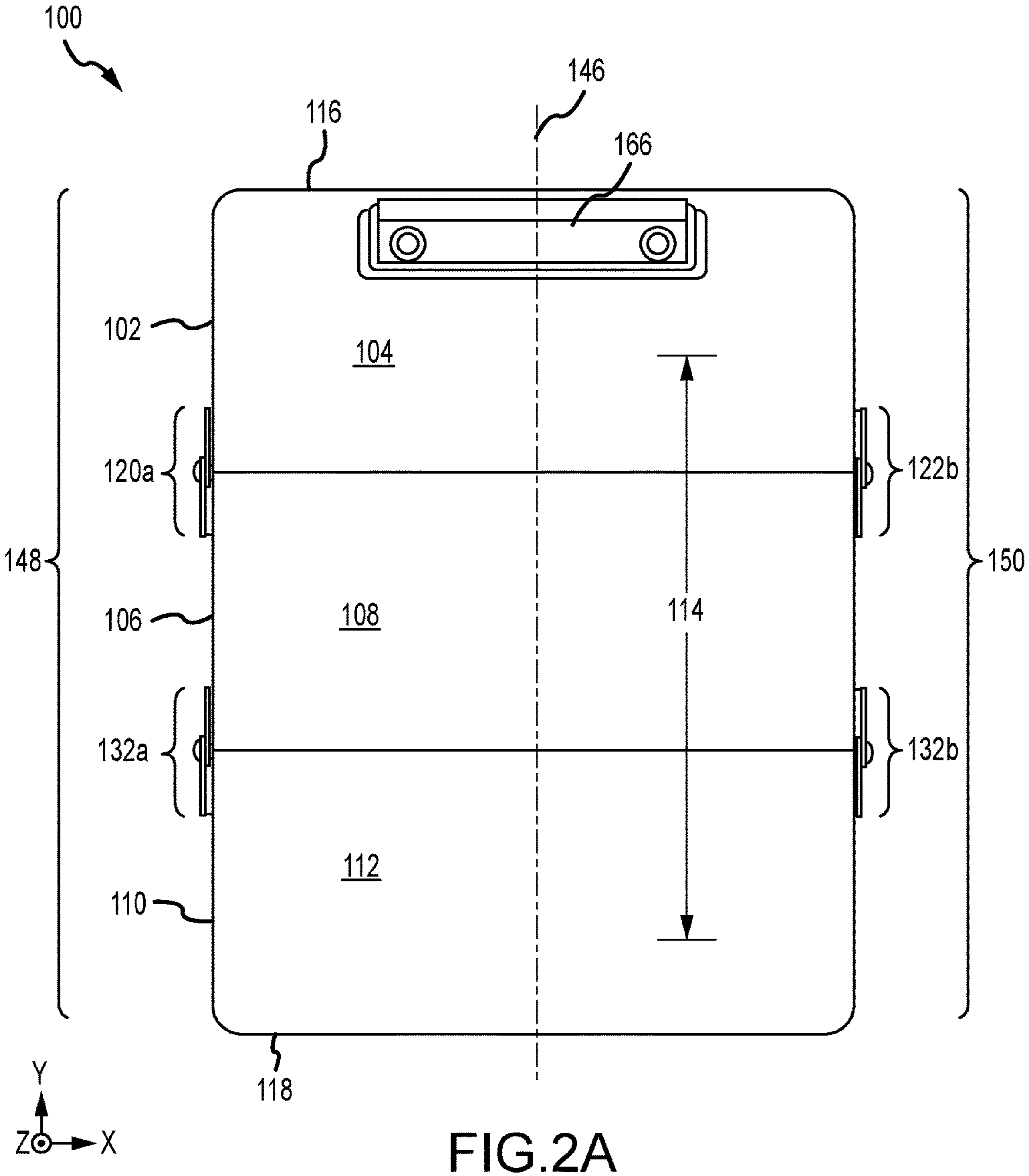
Figure 2B:
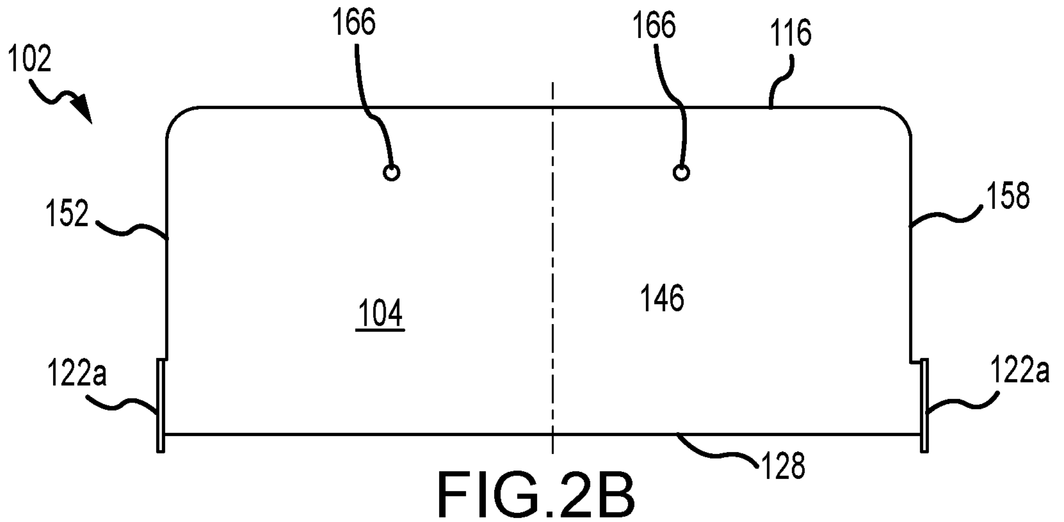
Figure 2C:
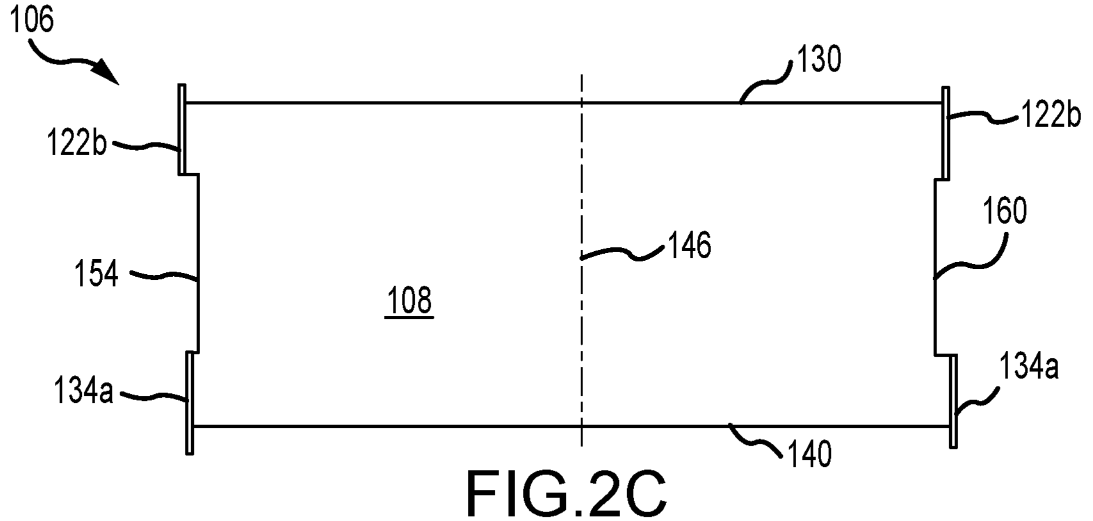
Figure 2D:
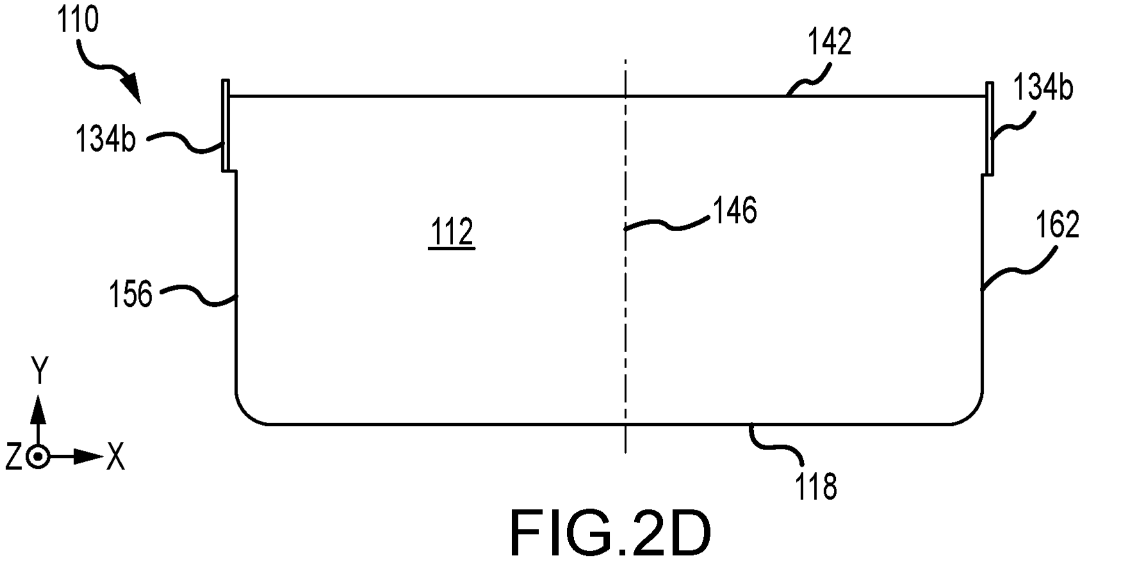
Figure 3:
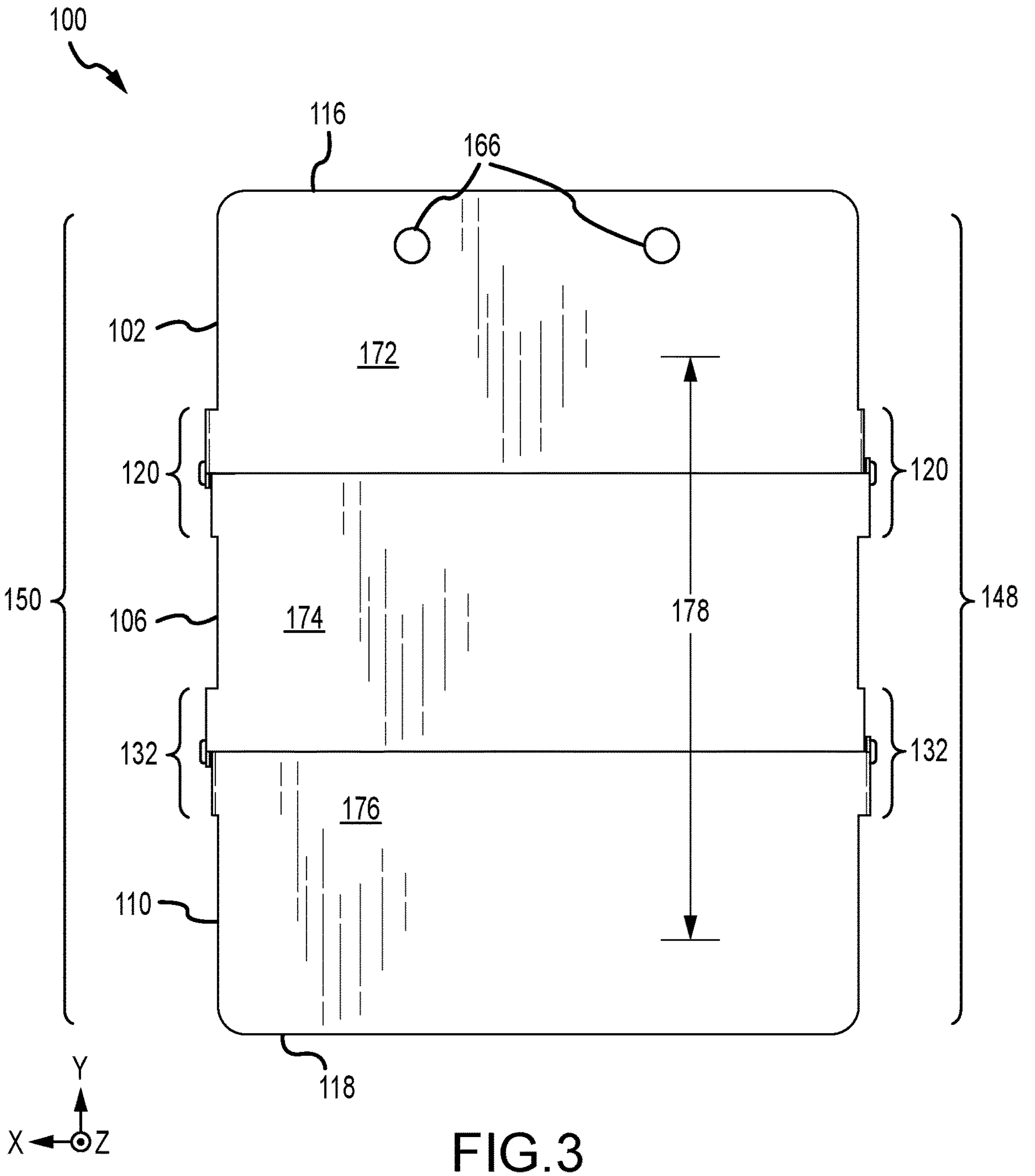
Figure 4:
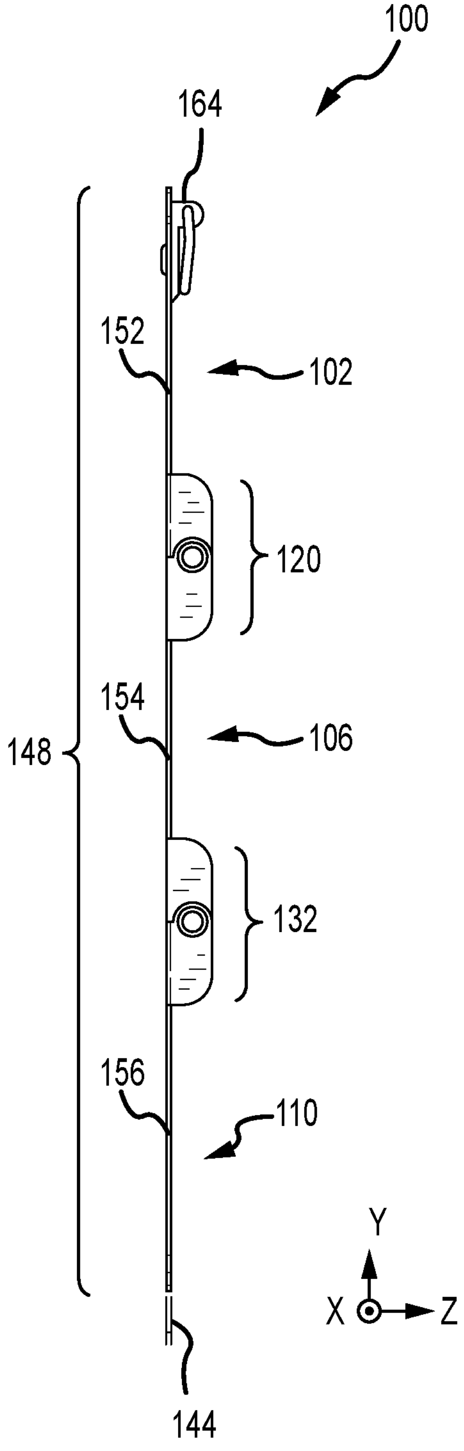
Figure 5:
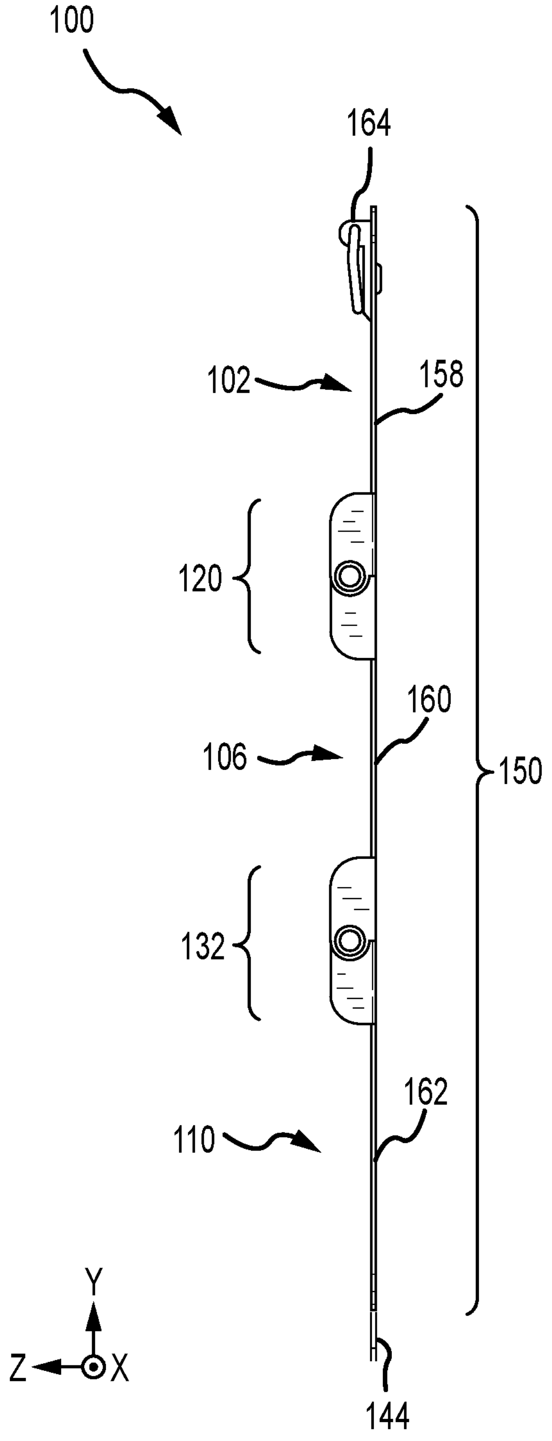
Figure 6:
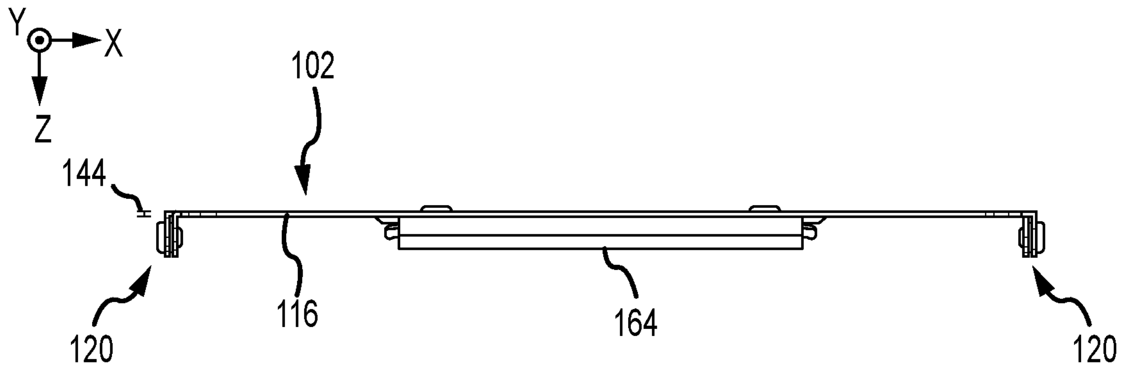
Figure 7:
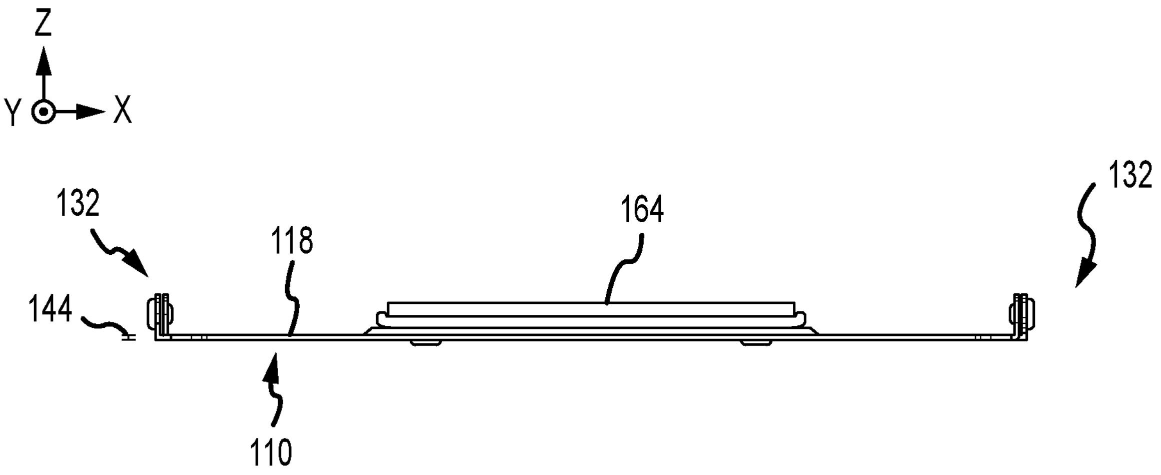
Figure 8:
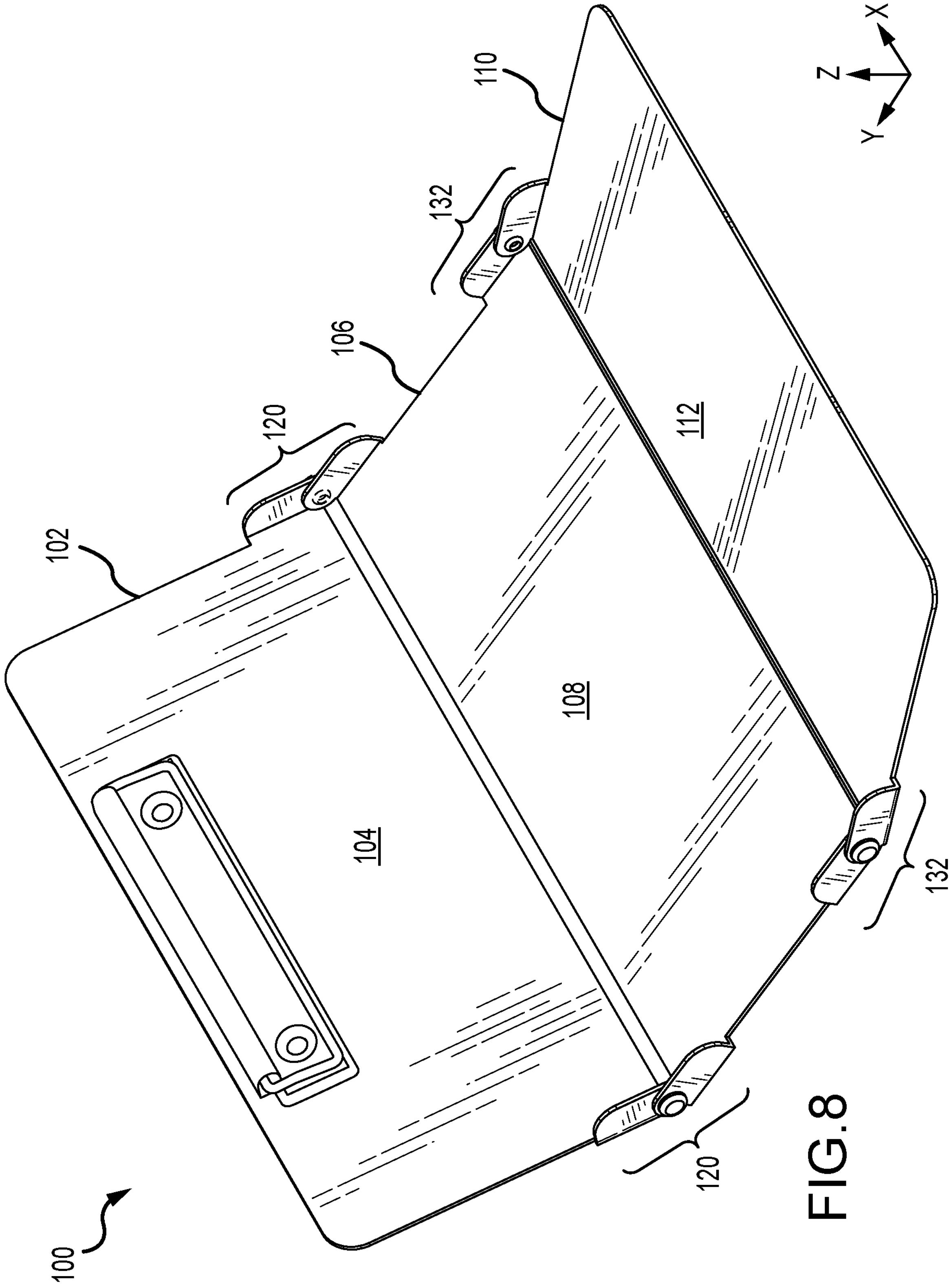
Figure 9:
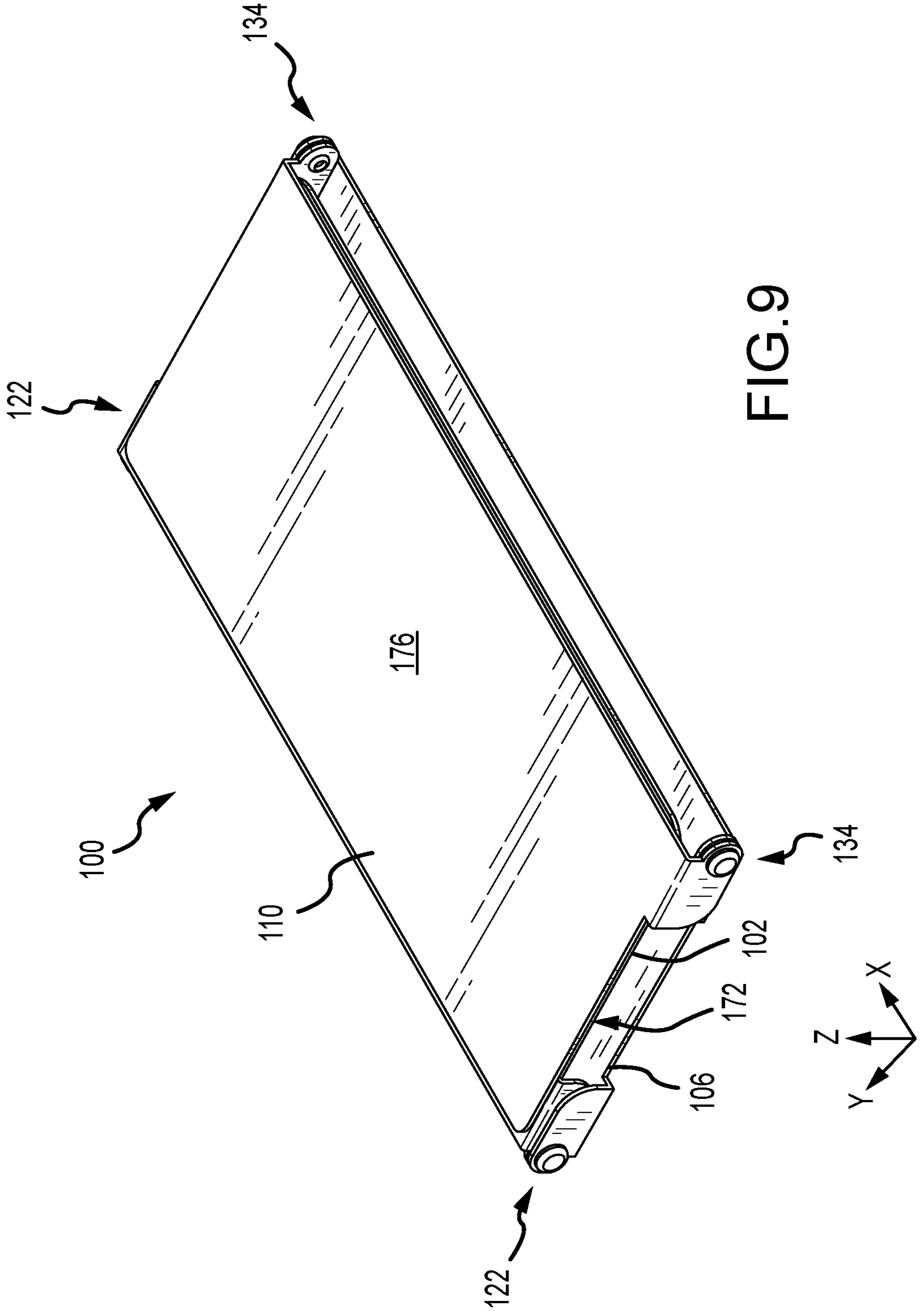
Figure 10:

FIG. 1A depicts a perspective view of a foldable clipboard in an unfolded configuration, in accordance with one or more embodiments of the present disclosure;

FIG. 1B depicts a perspective view of the foldable clipboard of FIG. 1A in an unfolded configuration and with a cover sheet, in accordance with one or more embodiments of the present disclosure;

FIG. 2A depicts a front elevation view of an upper surface of the foldable clipboard of FIG. 1A in the unfolded configuration, in accordance with one or more embodiments of the present disclosure;

FIG. 2B depicts a front elevation view of a top support panel of the foldable clipboard of FIG. 1A, in accordance with one or more embodiments of the present disclosure;

FIG. 2C depicts a front elevation view of a middle support panel of the foldable clipboard of FIG. 1A, in accordance with one or more embodiments of the present disclosure;

FIG. 2D depicts a front elevation of a bottom support panel of the foldable clipboard of FIG. 1A, in accordance with one or more embodiments of the present disclosure;

FIG. 3 depicts a rear elevation view of a lower surface of the foldable clipboard of FIG. 1A in the unfolded configuration, in accordance with one or more embodiments of the present disclosure;

FIG. 4 depicts a left elevation view of the foldable clipboard of FIG. 1A in the unfolded configuration, in accordance with one or more embodiments of the present disclosure;

FIG. 5 depicts a right elevation view of the foldable clipboard of FIG. 1A in the unfolded configuration, in accordance with one or more embodiments of the present disclosure;

FIG. 6 depicts a top plan view of the foldable clipboard of FIG. 1A in the unfolded configuration, in accordance with one or more embodiments of the present disclosure;

FIG. 7 depicts a bottom plan view of the foldable clipboard of FIG. 1A in the unfolded configuration, in accordance with one or more embodiments of the present disclosure;

FIG. 8 depicts a perspective view of the foldable clipboard of FIG. 1A in a state of transition between a folded configuration and an unfolded configuration, in accordance with one or more embodiments of the present disclosure;

FIG. 9 depicts a perspective view of the foldable clipboard of FIG. 1A in a folded configuration, in accordance with one or more embodiments of the present disclosure; and FIG. 10 depicts a perspective view of the foldable clipboard of FIG. 1A in a folded configuration, in accordance with one or more embodiments of the present disclosure;

DETAILED DESCRIPTION

FIGS. 1A-10 generally illustrate a foldable clipboard 100, in accordance with one or more embodiments of the present disclosure. In certain embodiments, the clipboard 100 includes an unfolded or non-compact form (e.g., as illustrated in FIG. 1A) with a large surface that facilitates note-taking or reading when in a first configuration. In other embodiments, the clipboard 100 also provides a folded or compact form (e.g., as illustrated in FIG. 9) that allows for increased ease of transportation and/or storage when in a second configuration. In some embodiments, the clipboard 100 includes components to facilitate the transition between the first configuration and the second configuration (e.g., at least a portion of the transition being illustrated in FIG. 8). In further embodiments, the clipboard 100 includes attachment features that retain items such as paper and the like against a surface of the clipboard when taking notes, transporting the items, storing the items, and the like. It is contemplated that the clipboard 100 may be of particular use to doctors, medical students, scientists, technicians, and other professionals. In one non-limiting example, the clipboard 100 may be folded to fit in a doctor's white coat, as illustrated in FIG. 10. In general, it should be understood that the clipboard 100 is usable in any environment or scenario where a foldable or compact clipboard is a desirable alternative to the single-panel, solid-backed clipboards known in the art. The clipboard 100 is provided as a nonlimiting example of one such foldable or compact clipboard. Various changes in form and detail can be made without departing from the scope of the present disclosure.

U.S. Pat. No. 7,673,908 (the '908 Patent) depicts an example foldable clipboard, and is incorporated herein in its entirety. The present disclosure provides numerous improvements over the clipboard of the '908 Patent. For example, the clipboard 100 as embodied in the present disclosure is capable of a more compact and storable configuration, as the increased number of panels reduces the overall footprint of the clipboard 100 when in the folded configuration. In addition, the clipboard 100 of the present disclosure differs from the '908 Patent with respect to the arrangement and operation of the actuation components (e.g., such as hinges) between various support panels of the clipboard 100. Further, the clipboard 100 of the present disclosure differs from the clipboard of the '908 Patent in regards to the orientation of an attachment feature relative to the movement of the actuation components and subsequent folding/unfolding of the support panels by the actuation components—namely, the clipboard 100 of the present disclosure folds and unfolds in the same direction as the document being held by the attachment feature via multiple sets of offsetting hinges.

In certain embodiments, the clipboard 100 includes a top support panel 102 with a top upper surface 104, a middle support panel 106 with a middle upper surface 108, and a bottom support panel 110 with a bottom upper surface 112. Some or all of the upper surfaces 104, 108, and 112 form a combined upper surface 114 (or writing surface) on the front of the support panels 102, 106, and 110. It is noted, however, that any surface on the front (e.g., the combined upper surface 114 with surfaces 104, 108, 112) or rear (e.g., a combined lower surface 178 with surface 172, 174, 176, as described in detail herein) of the support panels 102, 106, and 110 may be usable as a writing surface, without departing from the scope of the present disclosure.

The top support panel 102 and/or the bottom support panel 110 may include rounded corners to prevent the clipboard 100 from catching on a pocket, purse, or other carrying and storage device when in the folded or unfolded positions. It is noted, here, that the top support panel 102 and/or the bottom support panel 110 may include squared corners or corners other not fabricated with additional manufacturing steps (e.g., to decrease manufacturing costs for the clipboard 100) without departing from the scope of the present disclosure.

In some embodiments, the top support panel 102, the middle support panel 106, and the bottom support panel 110 are substantially equal in at least one dimension. In one non-limiting example, the support panels 102, 106, 110 may be configured such that the respective upper surfaces 104, 108, 112 are each approximately one third of the combined upper surface 114, with a top edge 116 of the top support panel 102 and a bottom edge 118 of the bottom support panel 110 overlapping when the clipboard 110 is in a folded or compact position (e.g., as illustrated in FIG. 9). It is noted that the support panels 102, 106, 110 being substantially equal in at least one dimension may reduce manufacturing costs, as it may allow for duplicate or swappable/interchangeable support panels for the clipboard 100. For example, the top support panel 102 and the bottom support panel 110 may be interchangeable for being substantially identical in size and shape.

It is noted, however, that the support panels 102, 106, 110 and respective upper surfaces 104, 108, 112 may be configured in any number of ways without departing from the scope of the present disclosure. In another non-limiting example, the middle support panel 106 may be approximately twice as large in at least one dimension at the top support panel 102 and/or the bottom support panel 110, such that the support panels 102, 110 fold onto the middle support panel 106 with the top edge 116 of the top support panel 102 and the bottom edge 118 of the bottom support panel 110 meeting over the middle upper surface 108 of the middle support panel 106 when the clipboard 110 is in a folded or compact position.

In some embodiments, the support panels 102, 106, 110 are fabricated from a metal such as aluminum, stainless steel (e.g., surgical stainless steel), or the like; a plastic; pressed board; or another suitable material. It is noted that aluminum provides a very strong, light-weight panel that is very durable. In addition, plastic also provides a fairly strong and light-weight panel that is relatively inexpensive to manufacture.

In various embodiments, the top support panel 102 and the middle support panel 106 are moveably connected via at least one actuation component 120. The at least one actuation component 120 may include a hinge 120 with a set of hinge plates 122 that are pivotably coupled via a hinge pin 124 and rotatable about an axis 126 through the hinge pin 124. For example, the clipboard 110 may include a set of hinges 120 positioned on the top support panel 102 and the middle support panel 106 on opposite sides (e.g., left and right sides) of the clipboard 100. By way of another example, the hinge 120 is a piano hinge (or other similar continuous hinge) with hinge plates 122 positioned at a bottom edge 128 of the top support panel 102 and an adjacent top edge 130 of the middle support panel 106. Additional hinge examples include, but are not limited to, a butt hinge or a knife hinge (or other similar pivot hinge). The hinge pin 124 may include a gasket, bearing assembly, and/or other suitable mechanism for facilitating the pivotable interconnection between the hinge plates 122.

It is noted that the axes 126 of the hinge pins 124 through the hinge plates 122 of the hinges 120 may be substantially coaxial, where there are multiple hinges 120.

In some embodiments, the hinge plates 122 are integrated with and formed as a part of a respective top support panel 102 and/or middle support panel 106. For example, the hinge plate 122 may be fabricated with a respective top support panel 102 and/or middle support panel 106 via one or more manufacturing processes including stamping, cutting, bending, or the like. In other embodiments, the hinge plates 122 are separate components from (and coupled to) a respective top support panel 102 and/or middle support panel 106.

In certain embodiments, the middle support panel 106 and the bottom support panel 110 are moveably connected via at least one actuation component 132. The at least one actuation component 132 may include a hinge 132 with a set of hinge plates 134 that are pivotably coupled via a hinge pin 136 and rotatable about an axis 138 through the hinge pin 136. For example, the clipboard 110 may include a set of hinges 132 positioned on the middle support panel 106 and the bottom support panel 110 on opposite sides (e.g., left and right sides) of the clipboard 100. By way of another example, the hinge 132 is a piano hinge with hinge plates 134 positioned at a bottom edge 140 of the middle support panel 106 and an adjacent top edge 142 of the bottom support panel 110. The hinge pin 136 may include a gasket, bearing assembly, and/or other suitable mechanism for facilitating the pivotable interconnection between the hinge plates 134.

It is noted that the axes 138 of the hinge pins 136 through the hinge plates 134 of the hinges 132 may be substantially coaxial, where there are multiple hinges 132.

In some embodiments, the hinge plates 134 are integrated with and formed as a part of a respective middle support panel 106 and/or bottom support panel 110. For example, the hinge plate 134 may be fabricated with a respective middle support panel 106 and/or bottom support panel 110 via one or more manufacturing processes including stamping, cutting, bending, or the like. In other embodiments, the hinge plates 134 are separate components from (and coupled to) a respective middle support panel 106 and/or bottom support panel 110.

In various embodiments, the hinges 120, 132 are operable to cause the respective top support panel 102 and the bottom support panel 110 to transition between an unfolded or open position to a folded or compact position relative to the middle support panel 106. In general, the hinges 120, 132 may be selected for and/or positioned on the clipboard 100 so as to prevent a raised portion or obstruction on the writing surface. In addition, the hinges 120, 132 may be selected for weight reduction, and/or for comfort when a user is holding the clipboard 100 (e.g., based on anthropometric data for the $50^{th}$ percentile, the $95^{th}$ percentile, or the like).

In one non-limiting example, the hinges 120, 132 may be configured such that both the top support panel 102 and the bottom support panel 110 are folded over on top of (or folded underneath) the middle support panel 106 when the clipboard 100 is in the folded or compact position. In this example, the support panels 102, 106, 110 may be in a U-configuration (e.g., as illustrated in FIG. 8) during transition between the unfolded or open position (e.g., as illustrated in FIG. 1) and the folded or compact position (e.g., as illustrated in FIG. 9).

In another non-limiting example, the hinges 120, 132 may be configured such that the top support panel 102 or the bottom support panel 110 are folded over and beneath the middle support panel 106 when the clipboard 100 is in the folded or compact position. In this example, the support panels 102, 106, 110 may be in a Z-configuration during transition between the unfolded or open position and the folded or compact position.

In certain embodiments, the hinges 120, 132 are operable to allow the top support panel 102 and/or the bottom support panel 110 to pivot approximately 180° relative to the middle support panel 106 between the unfolded and folded positions. For example, when in the unfolded position, the top support panel 102 and the bottom support panel 110 are each pivoted approximately 180' relative to the middle support panel 106. By way of another example, when in the folded position the top support panel 102 and the bottom support panel 110 are each generally 0°±20° relative the middle support panel 106.

It is noted the clipboard 100 has a substantially constant thickness 144 that is consistent between each of the support panels 102, 106, 110. The thickness 144, in combination with the proximity of the respective edges 128, 130 of the support panels 102, 106 and the respective edges 140, 142 of the support panels 106, 110 provide the clipboard 100 with a select amount of rigidity when in the unfolded or open position. The engaging of the edges 128, 130 and edges 140, 142 having the thickness 144 prevents the support panels 102, 106, 110 from opening past the respective intended positions when the clipboard 100 is in the unfolded or open position. The constant and consistent thickness 144 of the clipboard 100 facilitates the support panels 102, 106, 110 being substantially rigid and also facilitates the combined upper surface 114 being substantially planar, so as to provide a good support for writing.

It is noted, however, the hinges 120, 132 may be configured to allow the support panels 102, 106, 110 to fold past 180 degrees from the folded position, including up to 360 degrees from the folded position such that the opposite surfaces of the support panels 102, 106, 110 are in contact, without departing from the scope of the present disclosure. For example, the support panels 102, 106, 110 may include a gap that is large enough to prevent the edges 128, 130 and the edges 140, 142 from interacting when the top support panel 102 and/or the bottom support panel 110 are pivoting with respect to the middle panel 106.

It is noted the support panels 102, 106, 110 may be semi-rigid, depending on the type and thickness of the material forming the support panels 102, 106, 110, for purposes of the present disclosure. In addition, it is noted the support panels 102, 106, 110 may be substantially rigid, depending on the type and thickness of the material forming the support panels 102, 106, 110, for purposes of the present disclosure.

In certain embodiments, as illustrated in at least FIGS. 2A-2D, the clipboard 100 includes hinges 120*a*, 120*b* coupling the top support panel 102 to the middle support panel 106. Each of the hinges 120*a*, 120*b* include a set of hinge plates 122*a*, 122*b* coupled via a pin 124 (e.g., the pin 136 illustrated in at least FIGS. 1A, 1B). The hinge plates 122*a*, 122*b* are substantially perpendicular to the respective upper surfaces 104, 108, facilitating the movement of the hinge plate 122*a* of the top support panel 102 and the hinge surface plate 122*b* of the middle support panel 106 adjacent and substantially parallel to one another as the clipboard 100 transitions between the folded and unfolded positions.

The clipboard 100 also includes hinges 132*a*, 132*b* coupling the bottom support panel 110 to the middle support panel 106. Each of the hinges 132*a*, 132*b* include a set of hinge plates 134*a*, 134*b* coupled via a pin 136 (e.g., the pin 136 illustrated in at least FIGS. 1A, 1B). The hinge plates 134*a*, 134*b* are substantially perpendicular to the respective upper surfaces 108, 112, facilitating the movement of the hinge plate 134*a* of the bottom support panel 110 and the hinge surface 134*b* of the middle support panel 106 adjacent and substantially parallel to one another as the clipboard 100 transitions between the folded and unfolded positions.

The adjacent and substantially parallel movement by the hinge plates 122*a*, 122*b* and the hinge plates 134*a*, 134*b* on each support panel 102, 106, 110 is facilitated by the hinge plates 122*a*, 122*b* and the hinge plates 134*a*, 134*b* being different distances from a plane 146 positioned midway between side edges 148 and 150 and passing through the top edge 116 and the bottom edge 118 of the clipboard 100, while the side edges 148 and 150 are substantially equal in distance from the plane 146. Where each set of adjacent panels 102, 106 and 106, 110 have multiple hinges 120*a*, 120*b* and multiple hinges 132*a*, 132*b*, the hinge plates 122*a*, 122*b* and the hinge plates 134*a*, 134*b* are dimensioned to allow for offsetting overlaps between the respective sets of hinges 120*a*, 120*b* and hinges 132*a*, 132*b*.

The side edge 148 includes a side portion 152 of the top panel support 102, a side portion 154 of the middle panel support 106, and a side portion 156 of the bottom panel support 110. The offsetting of the hinge plates 122*a*, 122*b* and the hinge plates 134*a*, 134*b* allows the edge of the side portions 152, 154, 156 to be substantially adjacent and aligned in a first direction (e.g., a y-direction along the length of the clipboard 100) when the clipboard 100 is in the unfolded configuration to form the side edge 148, and to be substantially adjacent and aligned in a second direction (e.g., a z-direction) when the clipboard 100 is in the folded configuration.

The side edge 150 includes a side portion 158 of the top panel support 102, a side portion 160 of the middle panel support 106, and a side portion 162 of the bottom panel support 110. The offsetting of the hinge plates 122*a*, 122*b* and the hinge plates 134*a*, 134*b* allows the edge of the side portions 158, 160, 162 to be substantially adjacent and aligned in the first direction (e.g., the y-direction along the length of the clipboard 100) when the clipboard 100 is in the unfolded configuration to form the side edge 150, and to be substantially adjacent and aligned in the second direction (e.g., the z-direction) when the clipboard 100 is in the folded configuration.

The offsetting of the hinge plates 122*a*, 122*b* and the hinge plates 134*a*, 134*b* at the different distances from the plane 146 allows for a more compact hinge arrangement and a total reduced width of the clipboard 100. In addition, the offsetting of the hinge plates 122*a*, 122*b* and the hinge plates 134*a*, 134*b* at the different distances from the plane 146 allows for the top support panel 102 and the bottom support panel 110 to be the same fabricated component, aside from any final fabrication steps (e.g., drilling, or the like) necessary to couple an attachment feature 164 to the top support panel 102, thus reducing manufacturing costs.

Where there are multiple hinges 120 (e.g, hinges 120*a*, 120*b* as illustrated in FIGS. 2A-2D), it is noted the multiple hinges 120 may be considered a cooperative set of hinges and/or a single hinge assembly. For example, the axes through the respective pins 124 of the multiple hinges 120 may be coaxial, such that the multiple hinges 120 operate together and in a similar manner to actuate the top support panel 102 relative to the middle support panel 106.

Where there are multiple hinges 132 (e.g., hinges 132*a*, 132*b* as illustrated in FIGS. 2A-2D), it is noted the multiple hinges 132 may be considered a cooperative set of hinges and/or a single hinge assembly. For example, the axes through the respective pins 136 of the multiple hinges 132 may be coaxial, such that the multiple hinges 132 operate together and in a similar manner to actuate the bottom support panel 110 relative to the middle support panel 106.

In certain embodiments, the clipboard 100 includes one or more attachment features 164. The attachment feature 164 may include a spring clip sized to hold up to 50 or more pieces of paper to the clipboard 100. It is noted, however, the clipboard 100 may utilize other types of attachment features including, but not limited to, a low profile wire clip, a magnetic clip, two- or three-ring binder clips, screw-down clip, and the like without departing from the scope of the present disclosure.

The attachment feature 164 may be positioned on the top upper surface 104 and proximate to the top edge 116 of the top support panel 102. The top upper surface 104 may include one or more apertures 166 configured to receive the attachment feature 164. For example, the attachment feature 164 may be coupled to the top support panel 102 via the one or more apertures 166 (e.g., with fasteners, or the like), such that the attachment feature 164 may be removable from and re-attachable to the top support panel 102 as desired. By way of another example, the attachment feature 164 may be affixed to the top support panel 102 (e.g., with rivets, an adhesive, or the like) and thus immovable.

It is noted the attachment features 164 may be operable as a spacer between the support panels 102, 106, 110 to prevent contact between the support panels 102, 106, 110. For example, taller attachment features 164 may prevent the clipboard from fully folding to 0°, while shorter attachment features 164 may allow the clipboard to fold to 0° or past 0°.

In certain embodiments, the clipboard 100 may include one or more additional sets of apertures 166. The additional sets of apertures 166 may be positioned proximate to the side portion 152 and/or the side portion 158 of the top panel support 102. The additional sets of apertures 166 may be positioned proximate to the side portion 154 and/or the side portion 160 of the middle panel support 106. The additional sets of apertures 166 may be positioned proximate to the side portion 156 and/or the side portion 162 of the bottom panel support 110. The additional sets of apertures 166 may be positioned proximate to the bottom edge 118 of the clipboard 100.

Where the attachment feature 164 is removable (e.g., couplable to the apertures 166 via fasteners, or the like), the attachment feature 164 may be repositionable between any of the sets of apertures 166. In addition, the apertures 166 may pass through the support panels 102, 106, 110. In this regard, the attachment feature 164 may be usable on any of the support panels 102, 106, 110 when the clipboard 100 is in either the unfolded or open configuration and/or the folded or compact configuration.

When the interior edges 128, 130 of the adjacent panels 102, 106 and/or the interior edges 140, 142 of the adjacent panels 106, 110 are aligned substantially adjacent to one another, the support panels 102, 106, 110 collectively form a substantially continuous surface (e.g., the combined upper surface 114). In this configuration, the unfolded clipboard 100 may operate similarly as a rigid, single-panel clipboard known in the art. However, small misalignments or gaps may affect the ability of the foldable clipboard 100 to serve as a continuous and uninterrupted writing surface.

In certain embodiments, the clipboard 100 includes a sheet or other layer 168 that is positionable over at least a portion of the combined upper surface 114. The sheet or other layer 168 may be a substantially continuous piece of material, and may cover the gaps and/or misalignment between adjacent edges 128, 130 and/or 140, 142 between the respective panels 102, 106 and/or 106, 110.

The sheet or other layer 168 may be flexible, to allow for the sheet to transition with the support panels 102, 106, 110 between the unfolded or open position and the folded or compact position of the clipboard 100. The sheet or other layer 168 can be made from a variety of different materials, including, but not limited to, 0.010" vinyl. It is noted that thicker or thinner flexible material may be used, such as polycarbonate or polyester, without departing from the scope of the present disclosure.

In some embodiments, the sheet or other layer 168 may be securable the secured to the combined upper surface 114 in a temporary manner, with a removable adhesive, fasteners, integrated attachment features in the upper surfaces 104, 108, 112, or other similar temporary attachment features. Alternatively, in other embodiments, the sheet or other layer 168 may be secured to the combined upper surface 114 in a permanent manner, with a non-removable adhesive, fasteners, integrated attachment features in the upper surfaces 104, 108, 112, or other similar permanent attachment features. Further, in other embodiments the sheet or other layer 168 may not be secured to the combined upper surface 114.

Where the sheet or other layer 168 is secured, it is noted that the position or place of securing may be a predetermined distance from the adjacent edges 128, 130 and/or 140, 142 so as to not interfere with the pivoting of the respective support panels 102, 106 and/or 106, 110 relative to one another. In addition, it is noted that the securing may be a predetermined distance from one or more of the adjacent edge sides 148, 150 of the clipboard 100 (e.g., and thus one or more of the side portions 152, 154, 156, 158, 160, 162 of the panels 102, 106, 110) so as to not interfere with the pivoting of the respective support panels 102, 106 and/or 106, 110 relative to one another.

In one non-limiting example, the sheet or other layer 168 may not be adhered to the support panels 102, 106, 110 within one inch of the interior edges 128, 130, 140, 142 and/or the edges of the side portions 154, 156, 158, 160, 162, 164. However, it is contemplated that more or less of the sheet or other layer 168 can be left unadhered depending on the gap requirements between support panels for the selected hinges 120, 132. When a portion of the sheet or other layer 168 is left unadhered, the sheet is allowed to form a curved (or non-creasing) surface when the clipboard 100 is folded. This can help prevent papers held by the clipboard from creasing when the clipboard 100 is folded.

In some embodiments, the upper surfaces 104, 108, 112 and/or the sheet or other layer 168 is configurable to provide information to a user, with marking sections 170. The marking sections 170 may be pre-printed, may be non-permanently marked on by the user, and/or may be permanently marked on by the user. In one non-limiting example, on a clipboard 100 that is usable by doctors or medical students, the upper surfaces 104, 108, 112 and/or the sheet or other layer 168 may include reference information in the marking sections 170 used by doctors and medical students when charting patients. In another non-limiting example, on a clipboard 100 that is usable by a building inspector, the upper surfaces 104, 108, 112 and/or the sheet or other layer 168 can include building code and regulation information in the marking sections 170. In another non-limiting example, on a clipboard 100 that is usable by a coach, the upper surfaces 104, 108, 112 and/or the sheet or other layer 168 can include personnel information and an index of plays in the marking sections 170. In general, the upper surfaces 104, 108, 112 and/or the sheet or other layer 168 allows the clipboard 100 to be customized for virtually any task in the marking sections 170. It is noted the clipboard 100 may be further customized by applying information to the backsides of the support panels 102, 106, 110.

In certain embodiments, as illustrated in at least FIG. 3, the top support panel 102 includes a top lower surface 172, the middle support panel 106 includes a middle lower surface 174, and the bottom support panel 106 includes a bottom lower surface 176. The lower surfaces 172, 174, 176 together form a combined lower surface 178. The constant and consistent thickness 144 of the clipboard 100 facilitates the support panels 102, 106, 110 being substantially rigid and also facilitates the combined lower surface 178 being substantially planar, so as to provide a good support for writing.

Although certain embodiments of the present disclosure are directed to a single flexible sheet or other layer 168 positioned on or proximate to the combined upper surface 114, it is noted that the clipboard 100 may include any number of sheets or layers 168, with any number of marking sections 170, without departing from the scope of the present disclosure. For example, the clipboard 100 may include one or more sheets or layers 168 with one or more marking sections 170 positioned on or proximate to the combined upper surface 114; one or more of the upper surfaces 104, 108, 112 either separately or in combination; the combined lower surface 178; and/or one or more of the lower surfaces 172, 174, 176 either separately or in combination. In addition, in certain embodiments the clipboard 100 may not include any sheets or layers 168 positioned on or proximate to the combined upper surface 114, without departing from the scope of the present disclosure.

As illustrated in FIG. 9, the bottom upper surface 112 of the bottom support panel 110 may be proximate to the top lower surface 172 of the top support panel 102 when the clipboard 100 is in the folded or compact configuration, due to one non-limiting order of the top support panel 102 and the bottom support panel 106 transitioning from the unfolded or open position to the folded or compact position.

Referring generally to FIGS. 1, 8, and 9, a transition between the unfolded or open configuration and the folded or compact configuration for the clipboard 100 is illustrated. In particular, FIG. 1 illustrates the clipboard 100 in the unfolded or open configuration, where the top support panel 102 and the bottom support panel 106 are each in the unfolded or open position relative to the middle support panel 106. In addition, FIG. 8 illustrates the clipboard 100 in transition between configurations, with the top support panel 102 and the bottom support panel 106 each in a position of transition relative to the middle support panel 106. Further, FIG. 9 illustrates the clipboard 100 in the folded or compact configuration, where the top support panel 102 and the bottom support panel 106 are each in the folded or compact position relative to the middle support panel 106.

In some embodiments, the hinges 120, 132 and/or the adjacent panels 102, 106 and/or the adjacent panels 106, 110 may have locking components or mechanisms that engage when the clipboard 100 is fully in the unfolded or open position, and/or the folded or compact position. For example, the locking components or mechanisms hold the clipboard 100 in the unfolded or open position to prevent collapsing when attempting to write on the combined upper surface 114. By way of another example, the locking components or mechanisms hold the clipboard 100 in the folded or compact position to prevent the clipboard 100 from opening when stored or being transported.

In one non-limiting example, the top support panel 102 and the bottom support panel 110 may be 8.000 inches wide with two additional 0.375 inches radius corner, for a total surface width of 8.750 inches. The top support panel 102 and the bottom support panel 110 may be 3.850 inches in length. The middle support panel 106 may similarly have a surface width of 8.750 inches and may be 3.797 inches in length, such that the combined length of the support panels 102, 106, 110 when the clipboard 100 is in the unfolded or open position is 11.497 inches.

In one non-limiting example, the hinge plates 122, 134 may be 1.066 inches in length and 0.485 inches in height. The hinge plates 122, 134 may include a first larger corner radius of 0.300 inches and a second smaller corner radius of 0.201 inches. The second smaller corner radius includes a pin bore that is 0.156 inches in diameter. A central point of the pin bore is 0.202 inches from the outermost radius point of the second smaller corner, 0.565 inches from the first large corner central point, or 0.865 inches from the opposite end of the hinge plates 122, 134. The outermost radius point on the pin bore is 0.124 inches from the outermost radius point of the second smaller corner.

The second smaller corner radius of the hinge plates 122, 134 may extend beyond the length of the panels 102, 106, 110 as defined between respective top and bottom edges of the panels 102, 106, 110 described throughout the present disclosure. For example, a diameter line through the central point of the pin bore may be aligned with the bottom edge 128 of the top support panel 102, the top edge 130 of the middle support panel 106, the bottom edge 140 of the middle support panel 106, and/or the top edge 142 of the bottom support panel 110, such that the length of the hinge plates 122, 134 that aligns with the surfaces 104, 108, 112 of the support panels 102, 106, 110 is 0.865 inches. The distance between the internal edges of the hinge plates 122, 134 is 2.068 inches on the middle support panel 106.

As illustrated in FIGS. 2A-2D, hinge plates **122*a* may respectively be 0.035 inches outward from (or exterior to) the side portion 152, and 0.107 inches outward from (or exterior to) the side portion 158 of the top support panel 102. In addition, hinge plates 122*b* may respectively be 0.107 inches outward from (or exterior to) the side portion 154, and 0.035 inches outward from (or exterior to) the side portion 160 of the middle support panel 102. Further, hinge plates 134*a* may respectively be 0.035 inches outward from (or exterior to) the side portion 154, and 0.107 inches outward from (or exterior to) the side portion 160 of the middle support panel 106. Further, hinge plates 134*b* may respectively be 0.107 inches outward from (or exterior to) the side portion 156, and 0.035 inches outward from (or exterior to) the side portion 162 of the bottom support panel 110. These differences in exterior positioning relative to the respective side portions 152, 154, 156 of the side edge 148 and the respective side portions 158, 160, 162 of the side edge 150 causes the offset relative to the plane 146 that facilitates the movement of the hinge plates 122*a* with respect to the hinge plates 122*b* and/or the hinge plate 134*a* with respect to the hinge plates 134*b***.

It is noted the extending beyond the lengths of the panels 102, 106, 110 by the hinge plates 122, 134 and/or the heights of the hinge plates 122, 134 may provide an additional distance from the respective upper surfaces 104, 108, 112 that may accommodate the dimensions of the attachment feature 164 (e.g., is at least the total height of the attachment feature 164).

For example, the top support panel 102 may be capable between an unfolded or open position that is substantially at 0° relative to the middle support panel 106 and a folded or compact position that is substantially at 1800 relative to the middle support panel 106. Here, the top lower surface 172 of the top support panel 102 and the middle lower surface 174 of the middle support panel 106 are substantially parallel when the top support panel 102 is in either the unfolded or open position (e.g., in a shared or parallel plane), or the folded or compact position (e.g., in different, substantially parallel planes). It is noted, however, that if the distance is greater than the total height of the attachment feature 164, the top support panel 102 may be beyond parallel and slant at an angle with respect to the middle support panel 106 (e.g., having rotated more than 180° with respect to the middle support panel 106) when in the folded or compact position.

By way of another example, the bottom support panel 102 may be capable between an unfolded or open position that is substantially at 0° relative to the middle support panel 106 and a folded or compact position that is substantially at 1800 relative to the middle support panel 106. Here, the bottom lower surface 176 of the bottom support panel 110 and the middle lower surface 174 of the middle support panel 106 are substantially parallel when the bottom support panel 110 is in either the unfolded or open position (e.g., in a shared or parallel plane), or the folded or compact position (e.g., in different, substantially parallel planes). It is noted, however, that the bottom support panel 110 may slant at an angle with respect to the middle support panel 106 (e.g., having rotated less than 180° with respect to the middle support panel 106) when in the folded or compact position.

It is noted the above relationships may similarly hold true for the top lower surface 172 of the top support panel 102 and the bottom lower surface 176 of the bottom support panel being substantially parallel in shared or different planes, without departing from the scope of the present disclosure.

This non-limiting example of dimensions results in a clipboard 100 that can fully support a letter-sized piece of paper (e.g., 8.5×11 inches) when the clipboard 100 is in unfolded or open configuration. The dimensions also allow the clipboard 100 to be stowed in a pocket (e.g., of a doctor's white coat) in a sub-4 inch×sub-8.5×sub-1.5 inch footprint when it is in the folded or compact configuration. It is noted that the clipboard 100 can be sized and shaped differently to accommodate differently sized paper, different storage requirements, and/or any number of other factors without departing from the scope of this disclosure.

It is noted that the distancing of the hinge plates 122*a*, 122*b* and/or hinge plates 134*a*, 134*b* may be opposite, reversed, and/or generally different from the above non-limiting example, without departing from the scope of the present disclosure. For example, where the apertures 166 are symmetrically positioned about the plane 146, the attachment features 164 may be coupled to the clipboard 100 such that the combined upper surface 114 or the combined lower surface 178 is usable as a writing surface. Coupling the attachment feature 164 to the top upper surface 104 such that the combined upper surface 114 is the writing surface results in the hinges 120*a*, 120*b* and hinges 132*a*, 132*b* being offset in a first arrangement. Alternatively, coupling the attachment feature 164 to the top lower surface 172 such that the combined lower surface 178 is the writing surface results in the hinges 120*a*, 120*b* and hinges 132*a*, 132*b* being offset in a second arrangement that is flipped from the first arrangement. In the second arrangement, the respective distances that hinge plates are exterior to respective side portions is reversed that of the first arrangement.

In some embodiments, the hinge pins 124, 136 are removable from the hinges 120, 132. As illustrated with the above exemplary set of dimensions, the hinge plates 122, 134 may be similarly-dimensioned outward from respective side portions of the various support panels 102, 106, 110. As such, the top support panel 102 and the bottom support panel 110 may be swappable or interchangeable, being substantially identical in size and shape. In addition, the length of the clipboard 100 may be increased with the insertion of additional middle support plates 106 between the top support plate 102 and the middle support plate 106, between the middle support plate 106 and the bottom support plate 110, and/or between a first middle support plate 106 and a second middle support plate 106. In this regard, the clipboard 100 presents the possibility of a highly modular improvement over known art, one that is configurable to a particular user's needs. It is noted the height of the hinge plates 122, 134 and/or the gap between adjacent support panels may need to be adjusted to enable the continued collapsing from the unfolded or open position into the folded or compact position, which may be accomplished without departing from the scope of the present disclosure.

In this regard, the clipboard 100 according to the present disclosure provide a smooth writing surface when in the unfolded configuration, while at the same time providing improved portability and storability when in the folded configuration. Furthermore, when in the folded configuration, the clipboard 100 may house papers it is holding with the attachment feature 164 in an internal cavity defined by the support panels 102, 106, 110, thus providing an increased level of security for the papers both in terms of being held in place and the confidentiality regarding the content of the documents as necessary.

Various features and embodiments of a clipboard have been provided herein. It will be recognized, however, that various features are not necessarily specific to certain embodiments and may be provided on any one or more embodiments. The present disclosure and embodiments provided herein are not mutually exclusive and may be combined, substituted, and omitted. The scope of the invention(s) provided herein is thus not limited to any particular embodiment, drawing, or particular arrangement of features.

It is to be understood that the disclosure is not limited to particular methods or systems, which can, of course, vary. It is also to be understood that the terminology used herein is for the purpose of describing particular embodiments only and is not intended to be limiting.

A number of embodiments of the disclosure have been described. Nevertheless, it will be understood that various modifications may be made without departing from the spirit and scope of the present disclosure. Accordingly, other embodiments are within the scope of the following claims.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting.

The following claims particularly point out certain combinations and subcombinations regarded as novel and nonobvious clipboards. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application Such claims, whether broader, narrower, equal, or different in scope to the original claims, also are regarded as included within the subject matter of the present disclosure.

What is claimed is:

1. A foldable clipboard, comprising:

a top support panel with a top upper surface, the top support panel including at least one set of apertures operable to receive an attachment feature;

a middle support panel with a middle upper surface;

a bottom support panel with a bottom upper surface;

a first hinge pivotably coupling the top support panel to the middle support panel, the first hinge including a first hinge plate and a second hinge plate; and a second hinge pivotably coupling the middle support panel to the bottom support panel, the second hinge including a third hinge plate and a fourth hinge plate, wherein the first hinge plate is positioned outward from a first side portion of the top support panel an amount substantially equal to a first distance, wherein the second hinge plate is positioned outward from a first side portion of the middle support panel an amount substantially equal to a second distance, wherein the third hinge plate is positioned outward from the first side portion of the middle support panel an amount substantially equal to the first distance, wherein the fourth hinge plate is positioned outward from a first side portion of the bottom support panel an amount substantially equal to the second distance, wherein the first distance is different from the second distance, wherein the clipboard is capable of transitioning between a folded configuration and an unfolded configuration, wherein the top support panel and the bottom support panel are each capable of transitioning between a folded position and an unfolded position relative to the middle support panel via the first hinge and the second hinge, and wherein the top upper surface, the middle upper surface, and the bottom upper surface form a combined upper surface having a substantially constant and consistent thickness when the clipboard is in the unfolded configuration.

2. The clipboard of claim 1, wherein the attachment feature is a clip coupled to the top support panel via the at least one set of apertures and capable of securing items against at least the top upper surface.

3. The clipboard of claim 1, wherein the top support panel transitions first from the unfolded configuration to the folded configuration relative to the middle support panel, and the bottom support panel transitions second from the unfolded configuration to the folded configuration relative to the middle support panel, and wherein an upper surface of the bottom support panel is proximate to a lower surface of the top support panel when in the folded configuration.

4. The clipboard of claim 1, further comprising:

a third hinge pivotably coupling the top support panel to the middle support panel at a second location on a second side edge that is opposite a first location on a first side edge at which the first hinge pivotably couples the top support panel to the middle support panel; and a fourth hinge pivotably coupling the bottom support panel to the middle support panel at a fourth location on the second side edge that is opposite a third location on the first side edge at which the second hinge pivotably couples the bottom support panel to the middle support panel.

5. The clipboard of claim 4, wherein the top support panel and the middle support panel are pivotably coupled by the third hinge including a fifth hinge plate and a sixth hinge plate.

6. The clipboard of claim 5, wherein the fifth hinge plate is positioned outward from a second side portion of the top support panel an amount substantially equal to the second distance, and wherein the sixth hinge plate is positioned outward from a second side portion of the middle support panel an amount substantially equal to the first distance.

7. The clipboard of claim 5, wherein the first hinge plate and the fifth hinge plate are integrated with the top support panel, and wherein the second hinge plate and the sixth hinge plate are integrated with the middle support panel.

8. The clipboard of claim 5, wherein the first hinge plate is pivotable with respect to the second hinge plate about a first axis, wherein the fifth hinge plate is pivotable with respect to the sixth hinge plate about a second axis, wherein the first axis and the second axis are substantially coaxial.

9. The clipboard of claim 4, wherein the middle support panel and the bottom support panel are pivotably coupled by the fourth hinge including a seventh hinge plate and an eighth hinge plate.

10. The clipboard of claim 9, wherein the seventh hinge plate is positioned outward from a second side portion of the middle support panel an amount substantially equal to the second distance, and wherein the eighth hinge plate is positioned outward from a second side portion of the bottom support panel an amount substantially equal to the first distance.

11. The clipboard of claim 9, wherein the third hinge plate and the seventh hinge plate are integrated with the middle support panel, and wherein the fourth hinge plate and the eighth hinge plate are integrated with the bottom support panel.

12. The clipboard of claim 9, wherein the second hinge plate is pivotable with respect to the fourth hinge plate about a third axis, wherein the seventh hinge plate is pivotable with respect to the eighth hinge plate about a fourth axis, wherein the first axis and the second axis are substantially coaxial.

13. The clipboard of claim 4, wherein the set of hinge plates of the first hinge define a distance between the top upper surface of the top support panel and the middle upper surface of the middle support panel when the clipboard is in the folded configuration that is equal or greater to a total height of the attachment feature when installed on the top support panel.

14. The clipboard of claim 1, wherein the first distance is less than the second distance.

15. The clipboard of claim 1, wherein at least one of the top support panel, the middle support panel, and the bottom support panel are substantially rigid, wherein the top support panel and the bottom support panel are interchangeable for being substantially identical in size and shape, and wherein at least one of the top support panel, the middle support panel, or the bottom support panel are each fabricated from a metal or a plastic.

16. A foldable clipboard, comprising:

a top support panel with a top upper surface, the top support panel including at least one set of apertures operable to receive an attachment feature;

a middle support panel with a middle upper surface;

a bottom support panel with a bottom upper surface, wherein the bottom support panel and the top support panel are substantially identical in size and shape;

a first hinge pivotably coupling the top support panel to the middle support panel, the first hinge including a first hinge plate integrated with the top support panel and a second hinge plate integrated with the middle support panel; and a second hinge pivotably coupling the top support panel to the middle support panel, the second hinge including a third hinge plate integrated with the top support panel and a fourth hinge plate integrated with the middle support panel, wherein the first hinge plate is positioned outward from a first side portion of the top support panel an amount substantially equal to a first distance, wherein the second hinge plate is positioned outward from a first side portion of the middle support panel an amount substantially equal to a second distance, wherein the third hinge plate is positioned outward from a second side portion of the top support panel an amount substantially equal to the second distance, wherein the fourth hinge plate is positioned outward from a second side portion of the middle support panel an amount substantially equal to the first distance, wherein the first distance is different from the second distance, wherein the clipboard is capable of transitioning between a folded configuration and an unfolded configuration, and wherein the top support panel and the bottom support panel are each capable of transitioning between a folded position and an unfolded position relative to the middle support panel via the first hinge and the second hinge.

17. The clipboard of claim 16, wherein the top upper surface, the middle upper surface, and the bottom upper surface form a combined upper surface having a substantially constant and consistent thickness when the clipboard is in the unfolded configuration, and wherein the attachment feature is a clip coupled to the top support panel via the at least one set of apertures and capable of securing items against at least the combined upper surface.

18. The clipboard of claim 16, wherein the middle support panel and the bottom support panel are pivotably coupled by a third hinge including a fifth hinge plate and a sixth hinge plate, wherein the fifth hinge plate is positioned outward from the first side portion of the middle support panel an amount substantially equal to the first distance, wherein the sixth hinge plate is positioned outward from a first side portion of the bottom support panel an amount substantially equal to the second distance.

19. A foldable clipboard, comprising:

a first support panel with a first upper surface;

a second support panel with a second upper surface;

a third support panel with a third upper surface;

a first hinge pivotably coupling the first support panel to the second support panel, the first hinge including a first hinge plate and a second hinge plate;

a second hinge pivotably coupling the second support panel to the third support panel, the second hinge including a third hinge plate and a fourth hinge plate; and a clip coupled to the first support panel and capable of securing items against at least the first upper surface, wherein the first hinge plate is positioned outward from a first side portion of the first support panel an amount substantially equal to a first distance, wherein the second hinge plate is positioned outward from a first side portion of the second support panel an amount substantially equal to a second distance, wherein the third hinge plate is positioned outward from a second side portion of the second support panel an amount substantially equal to the second distance, wherein the fourth hinge plate is positioned outward from a side portion of the third support panel an amount substantially equal to the first distance, wherein the first distance is different from the second distance, wherein the clipboard is capable of transitioning between a folded configuration and an unfolded configuration, wherein the first support panel and the third support panel are each capable of transitioning between a folded position and an unfolded position relative to the second support panel via the first hinge and the second hinge, and wherein the first upper surface, the second upper surface, and the third upper surface form a combined upper surface having a substantially constant and consistent thickness when the clipboard is in the unfolded configuration.

20. The clipboard of claim 19, wherein the first support panel and the second support panel are pivotably coupled by a third hinge including a fifth hinge plate and a fourth hinge plate, wherein the fifth hinge plate is positioned outward from a second side portion of the first support panel an amount substantially equal to the second distance, wherein the sixth hinge plate is positioned outward from the second side portion of the second support panel an amount substantially equal to the first distance.

* * * * *